United States Patent [19]

Lefebvre et al.

[11] 3,875,113

[45] Apr. 1, 1975

[54] THERMOSETTING COMPOSITIONS DERIVED FROM AN EPOXY RESIN, A POLYAMINE AND AN IMIDE

[75] Inventors: Gerard Lefebvre; Bernard Rollet, both of Lyon, France

[73] Assignee: Rhone-Poulenc S.A., Paris, France

[22] Filed: Oct. 26, 1973

[21] Appl. No.: 409,935

[30] Foreign Application Priority Data
Oct. 31, 1972 France............................ 72.38609

[52] U.S. Cl. ............ 260/47 EN, 161/184, 260/2 N, 260/37 EP, 260/59, 260/72 R, 260/78.4 EP, 260/82.1, 260/88.3 A, 260/94.7 N, 260/830 P, 260/836
[51] Int. Cl. ........................................... C08g 30/14
[58] Field of Search ........... 260/2 N, 47 EN, 49, 59, 260/78.4 EP, 82.1, 88.3 A, 94.7 N, 72, 78 UA, 78 SC, 830 P, 37 EP

[56] References Cited
UNITED STATES PATENTS

| | | | |
|---|---|---|---|
| 3,346,665 | 10/1967 | Schwarzer............................ | 260/830 |
| 3,379,685 | 4/1968 | Preininger et al. ................... | 260/47 |
| 3,429,947 | 2/1969 | Eygen ..................................... | 260/2 |

*Primary Examiner*—Melvin Goldstein
*Assistant Examiner*—T. Pertilla
*Attorney, Agent, or Firm*—Stevens, Davis, Miller & Mosher

[57] ABSTRACT

The invention provides heat-resistant compositions which comprise an epoxy resin, a polyamine containing at least two primary amine groups and also either a compound ($\alpha$) of the formula:

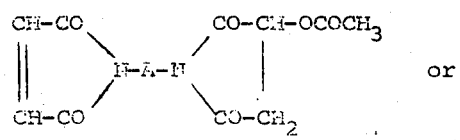

or

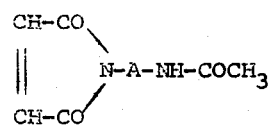

or a mixture of such compounds; or a compound ($\alpha$) and a bis-maleimide ($\beta$) of the formula:

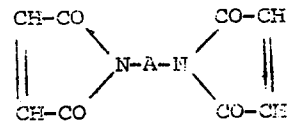

in which the symbol A represents a divalent hydrocarbon radical containing at least two carbon atoms, the bis-maleimide ($\beta$) being present in an amount up to about 90 percent by weight based on the weight of ($\alpha$) and ($\beta$). These compositions are useful for producing moulded objects and laminates.

9 Claims, No Drawings

THERMOSETTING COMPOSITIONS DERIVED FROM AN EPOXY RESIN, A POLYAMINE AND AN IMIDE

The present invention relates to thermosetting compositions based on epoxy resins.

The compositions of the present invention comprise an epoxy resin and a primary polyamine and, as the characteristic ingredient, a compound ($\alpha$) of the formula:

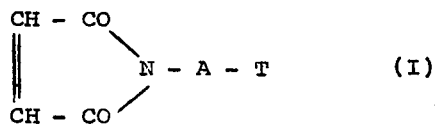 (I)

in which the symbol A represents a divalent hydrocarbon radical containing at least two carbon atoms and the symbol T denotes:

a radical $T_1$ of the formula:

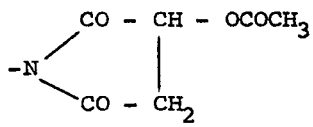

or a radical $T_2$ of the formula: —NH—COCH$_3$.

It should be understood that the expression "a compound ($\alpha$)" is intended to denote:

either a compound ($\alpha_1$) of the formula:

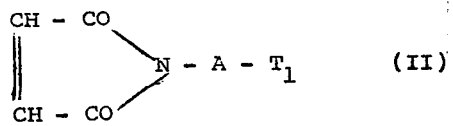 (II)

or a compound ($\alpha_2$) of the formula:

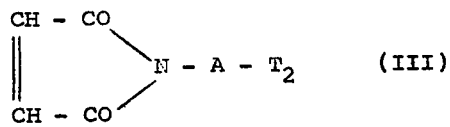 (III)

or a mixture of a compound ($\alpha_1$) and a compound ($\alpha_2$).

The term "epoxy resin" is used herein in its customary sense to denote a compound containing more than one

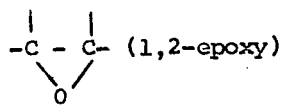 (1,2-epoxy)

group. Such a compound, which, depending on the proportion and nature of the initial reactants, is in the form of a more or less viscous liquid or of a solid of relatively low melting point, should be capable of being irreversibly cured to give a solid insoluble and infusible material.

The customary epoxy resins can be used in the compositions according to the invention. Thus it is possible to use polyglycidyl esters which can be obtained by reaction of a polycarboxylic acid with epichlorohydrin, or glycerine dichlorohydrin, in the presence of an alkali. Such polyglycidyl esters can be derived from aliphatic dicarboxylic acids, for example oxalic acid, succinic acid, glutaric acid, adipic acid, pimelic acid, suberic acid, azelaic acid, sebacic acid or linoleic acid which may be dimerised or trimerised, and from aromatic dicarboxylic acids, such as phthalic acid, isophthalic acid, terephthalic acid, naphthalene-2,6-dicarboxylic acid, diphenyl-2,2'-dicarboxylic acid and the bis(4-carboxyphenyl) ether of ethylene glycol.

More specifically, such polyglycidyl esters are, for example, diglycidyl adipate and those diglycidyl esters which correspond to the average formula:

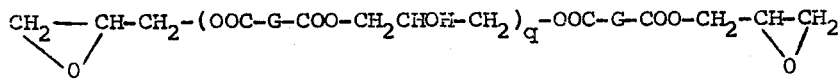

in which G represents a divalent hydrocarbon radical, such as a phenylene group, and $q$ represents an integral or fractional positive number.

Other examples of epoxy resins include polyglycidyl ethers which can be obtained by interaction of a divalent or polyvalent alcohol and epichlorohydrin or a similar substance such as glycerine dichlorohydrin either under alkaline conditions or in the presence of an acid catalyst with subsequent treatment with an alkali. These compounds can be derived from diols or polyols such as ethylene glycol, diethylene glycol, triethylene glycol, 1,2-propanediol, 1,3-propanediol, 1,4-butanediol, 1,5-pentanediol, 1,6-hexanediol, polyhydroxylic cycloalkanes, 2,4,6-hexanetriol, glycerine or N-aryl dialknolamines, such as N-phenyldiethanolamine, and are preferably derived from divalent or polyvalent phenols, such as resorcinol, catechol, hydroquinone, 1,4-dihydroxynaphthalene, 1,5-dihydroxynaphthalene, bis(4-hydroxyphenyl)methane, 1,1-,2,2-tetrahydroxyphenylethane, bis(4-hydroxyphenyl)-methyl-phenylmethane, bis(4-hydroxyphenyl)tolylmethanes, 4,4'-dihydroxydiphenyl, bis(4-hydroxyphenyl)sulphone and, in particular, 2,2-bis(4-hydroxyphenyl)propane or the condensation products of a phenol and an aldehyde.

It is similarly possible also to employ aminopolyepoxides such as those which can be obtained, for examples by dehydrohalogenation of the reaction products of epihalogenohydrins and primary or di-secondary amines, such as aniline, n-butylamine, bis(4-aminophenyl)methane or bis(4-methylaminophenyl)methane, and the epoxy resins obtained by epoxidation of cyclic and acyclic polyolefines such as vinylcyclohexene dioxide, limonene dioxide, dicyclopentadiene dioxide, the glycidyl ether of 3,4-epoxy-dihydro-dicyclopentadienyl, 3,4-epoxy-cyclohexylmethyl 3',4'-epoxy-cyclohexanecarboxylate and its 6,6'-dimethyl derivative, ethylene glycol bis(3,-4-epoxy-cyclohexane)carboxylate, the acetal formed between the carboxylic aldehyde of 3,4-epoxy-cyclohexane and 1,1-bis(hydroxymethyl)-3,4-epoxy-cyclohexane, and epoxidised butadienes or epoxidised copolymers of butadiene with ethylenic compounds such as styrene and vinyl acetate.

The epoxy equivalent weight, which represents the weight of resin (in grams) containing one gram equivalent of epoxy (groups) can vary within very wide limits. Preferably, resins of epoxy equivalent weight between 80 and 1,000 are used, but these values must not be regarded as limiting. As regards the physical characteristics of the resin, the products may vary from liquid resins of very low viscosity, for example about 2 cPo at 25°C, to solids of which the melting point can be as high as 180°C. However, liquid resins, or solid resins of melting point not exceeding 150°C, are preferred.

The polyamines which are used according to the invention are primary polyamines, that is to say polyamines containing at least two —NH₂ groups per molecule. Of course it is to be understood that secondary or tertiary amine groups may also be present. Furthermore, either a single polyamine or several polyamines can be employed in a particular composition.

In particular, it is possible to use an amine of the formula:

$$H_2N - E - NH_2 \qquad (IV)$$

in which the smybol E can represent a linear or branched alkylene radical with less than 13 carbon atoms, a phenylene or cyclohexylene radical or a radical of formula:

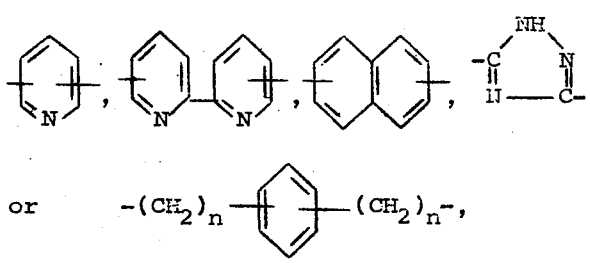

wherein $n$ represents an integer from 1 to 3. The symbol E can also comprise several alkylene radicals linked to one another by a divalent atom or group such as —O— or —NR₁—, or several phenylene or cyclohexylene radicals linked to one another by a simple valency bond or by an inert atom or group such as —O— or —S—, an alkylene group with 1 to 3 carbon atoms, —CO—, —SO₂—, —NR₁—, —N=N—, —CONH—, —COO—, —P(O)R₁— —CONH—X—NHCO—

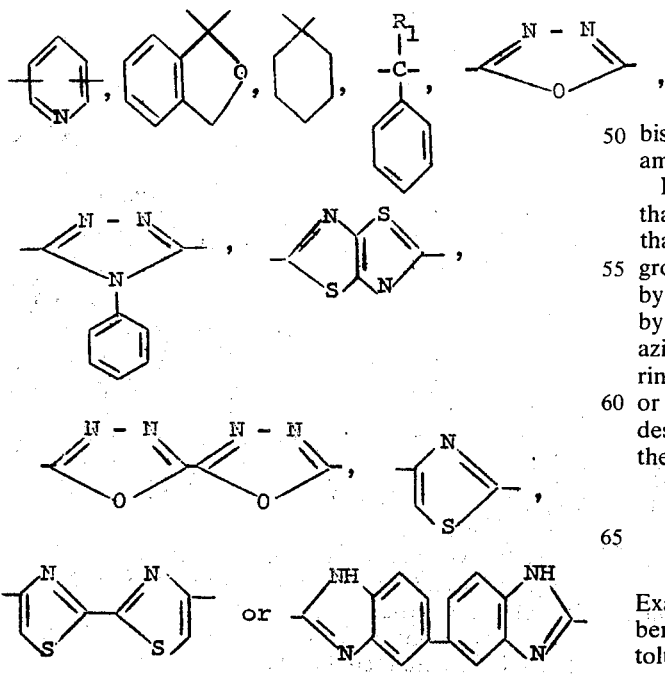

wherein R₁ represents a hydrogen atom, an alkyl radical with 1 to 4 carbon atoms, phenyl or cyclohexyl, and X represents an alkylene radical which can be branched and has less than 13 carbon atoms; the various phenylene or cyclohexylene radicals can be substituted by one or more methyl groups.

By way of illustration of the polyamines of the formula (IV), there may be mentioned 4,4'-diaminodicyclohexylmethane, 1,3-diaminocyclohexane, 1,4-diaminocyclohexane, 2,6-diaminopyridine, meta-phenylenediamine, para-phenylenediamine, 4,4'-diaminodiphenylmethane, 2,2-bis(4-aminophenyl)propane, benzidine, 4,4'-diaminophenyl ether, 4,4'-diaminophenyl sulphide, 4,4'-diaminodiphenyl sulphone, polyether-diamines such as those of the formula H₂N(CH₂)ₜO(CH₂CH₂O)ᵤ(CH₂)ₜNH₂, in which $t$ and $u$ are positive integers, diethylenetriamine, 3,3'-imino-bis-propylamine, bis-(hexamethylene)-triamine, triethylenetetramine, tetraethylenepentamine, pentaethylenehexamine, 7,8-diamino-p-methane, bis(4-aminophenyl)methylphosphine oxide, bis(4-aminophenyl)-phenylphosphine oxide, N,N-bis(4-aminophenyl)methylamine, 1,5-diaminonaphthalene, meta-xylylenediamine, para-xylylenediamine, 1,1-bis(para-aminophenyl)phthalane, α,ω-polymethylenediamines, in particular hexamethylene-diamine, 6,6'-diamino-2,2'-dipyridyl, 4,4'-diaminobenzophenone, 4,4'-diamino-azobenzene, bis(-4-aminophenyl)-phenylmethane, 1,1-bis(4-aminophenyl)cyclohexane, 1,1-bis(4-amino-3-methylphenyl)cyclohexane, 2,5-bis-(m-aminophenyl)-1,3,4-oxadiazole, 2,5-bis(p-aminophenyl)-1,3,4-oxadiazole, 2,5bis(m-aminophenyl)thiozola4,5-d)thiazole, 5,5'-di(m-aminophenyl)-2,2'-bis(1,3,4-oxadiazolyl), 4,4'-bis(p-aminophenyl)-2,2'-bithiazole, m-bis-[(4-p-aminophenyl)thiazolyl-2]benzene, 2,2'-bis(m-aminophenyl)-5,5'-dibenzimidazole, 4,4'-diaminobenzanilide, phenyl 4,4'-diaminobenzoate, N,N'-bis(4-aminobenzoyl)-p-phenylenediamine, 3,5-bis-(m-aminophenyl)-4-phenyl-1,2,4-triazole, N,N'-bis(p-aminobenzoyl)-4,4'-diaminodiphenylmethane, bis-p-(4-aminophenoxycarbonyl)benzene, bis-p-(4-aminophenoxy)-benzene, 3,5-diamino-1,2,4-triazole, 1,1-bis(4-aminophenyl)-1-phenyl-ethane and 3,5-bis(4-aminophenyl)-pyridine.

It is also possible to use polyamines containing more than two —NH₂ groups, preferably those with fewer than 50 carbon atoms and possessing 3 to 5 —NH₂ groups per molecule. The —NH₂ groups can be carried by, for example, a benzene ring optionally substituted by methyl groups, or by a naphthalene, pyridine or triazine ring; they can also be carried by several benzene rings linked to one another by a simple valency bond or by an inert atom or group which can be one of those described above in connection with the definition of the symbol E or can be

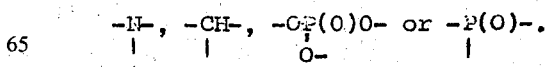

Examples of such polyamines include 1,2,4-triaminobenzene, 1,3,5-triamino-benzene, 2,4,6-triaminotoluene, 2,4,6-triamino-1,3,5-trimethyl-benzene, 1,3,7- triamino-naphthalene, 2,4,4'-triamino-diphenyl, 2,4,6-triamino-pyridine, 2,4,4'-triamino-phenyl ether, 2,4,4'-triamino-diphenylmethane, 2,4,4'-triamino-diphenylsulphone, 2,4,4'-triamino-benzophenone, 2,4,4'-triamino-3-methyl-diphenylmethane, N,N,N-tri(4-aminophenyl)amine, tri(4-aminophenyl)methane, 4,4',4''-triaminophenyl orthophosphate, tri(4-aminophenyl)phosphine oxide, 3,5,4'-triamino-benzanilide, melamine, 3,5,3',5'-tetra-amino-benzophenone, 1,2,4,5-tetra-amino-benzene, 2,3,6,7-tetra-aminonaphthalene, 3,3'-diamino-benzidine, 3,3',4,4'-tetra-aminophenyl ether, 3,3',4,4'-tetra-aminodiphenylmethane, 3,3',4,4'-tetra-aminodiphenylsulphone, 3,5-bis(3,4-diaminophenyl)-pyridine and the oligomers of the average formula:

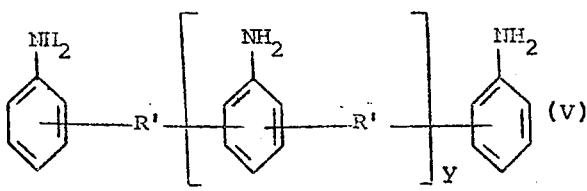

in which y represents a number ranging from about 0.1 to 2 and R' represents a divalent hydrocarbon radical having 1 to 8 carbon atoms derived from an aldehyde or a ketone of the general formula:

$$O = R' \qquad (VI)$$

in which the oxygen atom is linked to a carbon atom of the radical R'; typical aldehydes and ketones include formaldehyde, acetaldehyde, benzaldehyde, oenanthaldehyde, acetone, methyl ethyl ketone, 2-hexanone, cyclohexanone and acetophenone. These oligomers with amino groups can be obtained according to known processes such as those described in French Pat. Nos. 1,430,977, 1,481,935 and 1,533,696.

The respective amounts of the epoxy resin, polyamine and the compound ($\alpha$) are generally chosen so that:

the ratio ($r_1$) of the weight of the compound ($\alpha$) to the weight of epoxy resin is between 0.1 and 10 and preferably between 0.5 and 10, the ratio ($r_2$) of the number of maleimide groups introduced by the compound ($\alpha$) to the number of $NH_2$ groups introduced by the polyamine is between 0.5 and 20 and preferably between 1 and 5 and the ratio ($r_3$) of the number of $NH_2$ groups introduced by the polyamine to the number of epoxy groups introduced by the resin is between 0.4 and 20 and preferably between 0.5 and 5.

The symbol A in formulae (I) to (III) can have one of the meanings given for the symbol E of formula (IV).

Specific examples of compounds of formula (II) include: 1-maleimido-2-acetoxy-succinimido-ethane, 1-maleimido-6-acetoxysuccinimido-hexane, 1-maleimido-4-acetoxysuccinimido-benzene, 1-maleimido-3-acetoxysuccinimido-benzene, 4-maleimido-4'-acetoxysuccinimido-diphenylmethane, 4-maleimido-4'-acetoxysuccinimido-diphenyl ether, 4-maleimido-4'-acetoxysuccinimido-diphenylsulphone, 4-maleimido-4'-acetoxysuccinimido-diphenyl and 2-maleimido-6-acetoxysuccinimido-pyridine.

These compounds of formula (II) can be prepared, for example, by reacting $\alpha$-acetoxysuccinic anhydride with the corresponding monomaleamic acid:

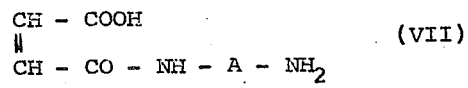

in a diluent such as acetone, and then subjecting the acetoxy-bis-maleamic acid thus obtained to a cyclising dehydration by application of the known methods for the conversion of bis-maleamic acids into bis-maleimides.

The monomaleamic acids of formula (VII) can easily be obtained by introducing maleic anhydride into a molar excess of diamine $A(NH_2)_2$ dissolved in a hydrocarbon such as benzene, heptane, or cyclohexane. The insoluble monomaleamic acid can be isolated by, for example, filtration.

Specific examples of compounds of formula (III) include: 1-Maleimido-2-acetamido-ethane, 1-maleimido-6-acetamido-hexane, 1-maleimido-4-acetamido-benzene, 1-maleimido-3-acetamido-benzene, 4-maleimido-4'-acetamido-diphenylmethane, 4-maleimido-4'-acetamido-diphenyl ether, 4-maleimido-4'-acetamido-diphenylsulphone, 4-maleimido-4'-acetamido-diphenyl and 2-maleimido-6-acetamido-pyridine.

These compounds with an acetamido group can be prepared by reaction of acetic anhydride with the corresponding monomaleamic acid by application of the known methods for obtaining maleimides from maleamic acids.

In addition to the epoxy resin, the primary polyamine and the compound ($\alpha$), the compositions according to the invention can also comprise a bis-maleimide ($\beta$) of the general formula:

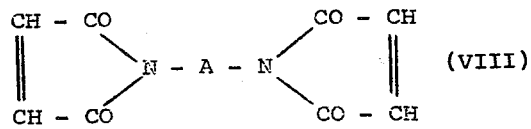

in which the symbol A is defined as above.

Specific examples of bis-imides ($\beta$) include: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-diphenylether-bis-maleimide, N,N'-4,4'-diphenylsulphone-bis-maleimide, N,N'-4,4'-dicyclohexylmethane-bis-maleimide, N,N'-4,4'-(3,5-diphenyl-pyridine)-bis-maleimide, N,N'-pyridine-2,6-diyl-bis-maleimide, N,N'-$\alpha,\alpha'$-4,4'-dimethylene-cyclohexane-bis-maleimide, N,N'-meta-xylylene-bis-maleimide, N,N'-para-xylylene-bis-maleimide, N,N'-4,4'-diphenylcyclohexane-bis-maleimide, N,N'-4,4'-(1,1-diphenylpropane)-bis-maleimide, N,N'-4,4'-(1,1,1-triphenyl-ethane)-bis-maleimide, N,N'-4,4'-triphenylmethane-bis-maleimide, N,N'-3,5-triazole-1,2,4-bis-maleimide and N,N'-4,4'-biphenylene-bis-maleimide. These bis-imides can be prepared as described in, for example, U.S. Pat. No. 3,018,290 or British Pat. Specification No. 1,137,592.

If the compositions according to the invention comprise a bis-maleimide ($\beta$), the latter can represent, by weight, up to 90 percent of the weight of the combination of compound ($\alpha$) and bis-maleimide ($\beta$).

The amount of bis-maleimide ($\beta$) is such that:

The ratio ($r'_1$) of the weight of the combination of [compound ($\alpha$) + bis-maleimide ($\beta$)] to the weight of epoxy resin, and the ratio ($r'_2$) of the number of maleimide groups introduced by the compound ($\alpha$) and the bis-maleimide ($\beta$) to the number of $NH_2$ groups introduced by the polyamine, assume the values defined above for the ratios ($r_1$) and ($r_2$), respectively.

The compositions according to the invention can be prepared by heating a mixture of all the ingredients until a generally homogeneous liquid mixture is obtained, at a temperature of the order of 50° to 200°C. It is also possible, in a first stage, to heat the mixture of polyamine, compound ($\alpha$) and, optionally, bis-maleimide ($\beta$) to a temperature of the order of 50° to 200°C. and then to incorporate the epoxy resin into the mixture. Alternatively, the mixture of polyamine + compound ($\alpha$) and, optionally, ($\beta$) can be added to the epoxy resin, if appropriate after having been heated as indicated above, cooled and converted to a powder.

The compositions of the present invention can be used as they are. They can also contain fibrous or pulverulent fillers, such as asbestos fibres or glass fibres, mica, silica, alumina, metallic particles, aluminium, magnesium and zirconium silicates, calcium carbonate and synthetic polymer particles such as polytetrafluoroethylene or fluorinated copolymers.

These compositions, in the liquid state or in the form of a powder obtained after cooling and grinding the composition, can be used for the production of moulded articles by, for example, hot moulding or compression moulding, depending on the physical state of the composition. They can also be employed as a solution, for example for the production of laminates, of which the reinforcing structure may be based on inorganic fibres, vegetable fibres or synthetic fibres.

These compositions can be cured by heating to a temperature which is generally between 180° and 280°C, and preferably between 200° and 250°C. They can advantageously be subjected to a post-heating treatment at a temperature which can be as high as 300°C.

The following Examples further illustrate the present invention.

EXAMPLE 1

47.1 g. of a liquid epoxy resin which can be represented by the average formula:

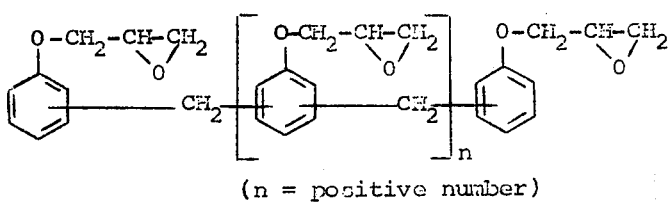

(n = positive number)

which has an epoxy equivalent weight of 176–181 and is marketed under the name "Epikote 154", 47.1 g. of 4-maleimido-4'-acetamido-diphenylmethane and 5.8 g. of bis(4-aminophenyl)methane are introduced into a container kept in a liquid heated to 150°C.

When the mixture melts, it is stirred and a vacuum of 1 mm. of mercury is gradually set up in order to remove the dissolved air. These conditions are maintained for 5 minutes.

The liquid mixture is thereafter cast in a parallepiped mould (125 mm × 75 mm × 6 mm), the internal walls of which are coated with polytetrafluoroethylene, and which has been heated beforehand to 200°C.

The whole is left for 24 hours at this temperature and the moulding is then released whilst hot and subjected to a supplementary heat treatment lasting 24 hours at 250°C.

The moulding then has a flexural breaking strength of 12 kg/mm² at 25°C. After a heat test lasting 1,500 hours at 250°C, this strength is 8 kg/mm².

EXAMPLE 2

46.2 g. of the epoxy resin described in Example 1, 27.7 g. of 4-maleimido-4'-acetamido-diphenylmethane, 18.5 g. of N,N'-4,4'-diphenylmethane-bis-maleimide and 7.6 g. of bis(4-aminophenyl)methane are mixed at 150°C.

This mixture is moulded by casting it under the conditions described in Example 1.

The moulding has a flexural breaking strength of 13.3 kg/mm² at 25°C. After a heat test lasting 1,500 hours at 250°C, this strength is 11.2 kg/mm².

EXAMPLE 3

45.3 g. of a solid epoxy resin which can be represented by the average formula:

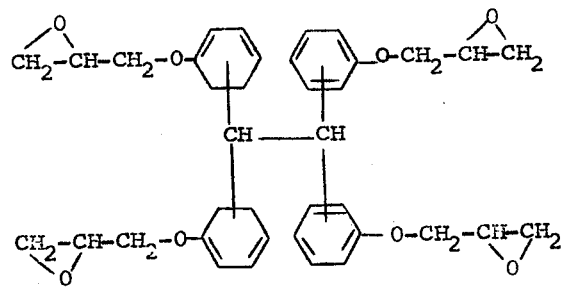

which has an epoxy equivalent weight of 210–240 and is marketed under the name "Epikote 1031", 6.8 g. of 4-maleimido-4'-acetamido-diphenylmethane, 38.5 g. of N,N'-4,4'-diphenylmethane-bis-maleimide and 9.4 g. of bis(3-aminophenyl)methane are mixed at 150°C.

This mixture is moulded by casting it under the conditions described in Example 1.

The moulding has a flexural breaking strength of 13 kg/mm² at 25°C. After a heat test lasting 1,500 hours at 250°C, this strength is 12.2 kg/mm².

EXAMPLE 4

47.7 g. of "Epikote 154," 47.7 g. of 4-maleimido-4'-acetoxysuccinimido-diphenylmethane and 4.6 g. of bis(4-aminophenyl)methane are introduced into a container kept in a liquid heated to 110°C.

When the mixture melts, it is stirred and a vacuum of 1 mm. of mercury is gradually set up to remove the dissolved air. These conditions are maintained for 5 minutes.

The liquid mixture is then cast in a parallelepiped mould (125 mm × 75 mm × 6 mm) the internal walls of which are coated with polytetrafluoroethylene, and which has been heated beforehand to 200°C.

The whole is left for 24 hours at this temperature and the moulding is then removed hot and subjected to a supplementary heat treatment lasting 24 hours at 250°C.

It then has a flexural breaking strength of 10 kg/mm² at 25°C. After a heat test lasting 1,500 hours at 250°C. this strength is 8 kg/mm².

EXAMPLE 5

47.4 g. of the epoxy resin described in Example 1, 23.7 g. of 4-maleimido-4'-acetoxysuccinimido-diphenylmethane, 23.7 g. of 4-maleimido-4'-acetamido-diphenylmethane and 5.2 g. of bis(4-aminophenyl)methane are mixed at 110°C.

This mixture is moulded by casting under the conditions described in Example 1.

The moulding has a flexural breaking strength of 10.8 kg/mm² at 25°C. After a heat test lasting 1,500 hours at 250°C, this strength is 9.4 kg/mm².

EXAMPLE 6

46.6 g. of a cycloaliphatic epoxy resin marketed under the name "Epikote 173," having an epoxy equivalent weight of 185–198, 27.9 g. of 4-maleimido-4'-acetoxysuccinimido-diphenylmethane, 18.7 g. of N,N'-4,4'-diphenylmethane-bis-maleimide and 6.8 g. of bis(4-aminophenyl)methane are mixed at 110°C.

This mixture is moulded by casting under the conditions described in Example 1.

The moulding has a flexural breaking strength of 13 kg/mm² at 25°C.

EXAMPLE 7

45.3 g. of the epoxy resin described in Example 1, 2.7 g. of 4-maleimido-4'-acetoxysuccinimido-diphenylmethane, 3.6 g. of 4-maleimido-4'-acetamido-diphenylmethane, 39.0 g. of N,N'-4,4'-diphenylmethane-bis-maleimide and 9.4 g. of bis(4-aminophenyl)methane are mixed at 150°C.

This mixture is moulded by casting under the conditions described in Example 1.

The moulding has a flexural breaking strength of 13.7 kg/mm² at 25°C. After a heat test lasting 1,500 hours at 250°C. this strength is 12.6 kg/mm².

We claim:

1. A heat-resistant composition which comprises an epoxy resin containing more than one 1,2-epoxy group, a polyamine containing at least two primary amine groups and also either a compound ($\alpha$) of the formula:

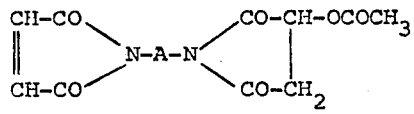 or 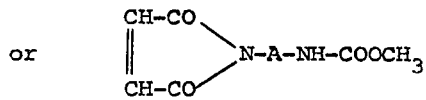

or a mixture of such compounds; or a compound ($\alpha$) and a bis-maleimide ($\beta$) of the formula:

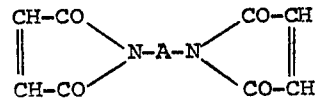

in which the symbol A represents a divalent hydrocarbon radical containing at least two carbon atoms, the bis-maleimide ($\beta$) being present in an amount up to about 90 percent by weight based on the weight of ($\alpha$) and ($\beta$).

2. A composition according to claim 1 in which the ratio of the number of maleimide groups introduced by the compound ($\alpha$) and the bis-maleimide ($\beta$), if present, to the number of $NH_2$ groups introduced by the polyamine is between 0.5 and 20.

3. A composition according to claim 2, in which said ratio is between 1 and 5.

4. A composition according to claim 1, in which the ratio of the weight of compound ($\alpha$) and of bis-maleimide ($\beta$), if present, to the weight of epoxy resin is between 0.1 and 10.

5. A composition according to claim 4, in which the said ratio is between 0.5 and 10.

6. A composition according to claim 1 in which the ratio of the number of $NH_2$ groups introduced by the polyamine to the number of epoxide groups introduced by the resin is between 0.4 and 20.

7. A composition according to claim 1 which also comprises a fibrous or pulverulent filler.

8. A composition according to claim 1 in which the compound ($\alpha$) is 1-maleimido-2-acetoxy-succinimido-ethane, 1-maleimido-6-acetoxysuccinimido-hexane, 1-maleimido-4-acetoxysuccinimido-benzene, 1-maleimido-3-acetoxy-succinimido-benzene, 4-maleimido-4'-acetoxysuccinimido-diphenylmethane, 4-maleimido-4'-acetoxysuccinimido-diphenyl ether, 4-maleimido-4'-acetoxysuccinimido-diphenylsulphone, 4-maleimido-4'-acetoxysuccinimido-diphenyl, 2-maleimido-6-acetoxysuccinimido-pyridine, 1-maleimido-2-acetamido-ethane, 1maleimido-6-acetamido-hexane, 1-maleimido-4-acetamido-benzene, 1-maleimido-3-acetamido-benzene, 4-maleimido-4'-acetamido-diphenylmethane, 4-maleimido-4'-acetamido-diphenyl ether, 4-maleimido-4'-acetamido-diphenylsulphone, 4-maleimido-4'-acetamido-diphenyl or 2-maleimido-6-acetamido-pyridine.

9. A heat-resistant article obtained by heating a composition as defined in claim 1 to a temperature of 180° to 280°C.

* * * * *